United States Patent
Baker et al.

(10) Patent No.: US 8,908,549 B2
(45) Date of Patent: Dec. 9, 2014

(54) RESOURCE ALLOCATION IN A COMMUNICATION NETWORK

(75) Inventors: Matthew Baker, Canterbury (GB); Timothy Moulsley, Caterham (GB); Milos Tesanovic, Cambridge (GB)

(73) Assignees: Koninklijke Philips N.V., Eindhoven (NL); Sharp Kabushiki Kaisha, Osaka (JP)

( * ) Notice: Subject to any disclaimer, the term of this patent is extended or adjusted under 35 U.S.C. 154(b) by 232 days.

(21) Appl. No.: 13/381,110

(22) PCT Filed: Jun. 23, 2010

(86) PCT No.: PCT/IB2010/052842
§ 371 (c)(1),
(2), (4) Date: Dec. 28, 2011

(87) PCT Pub. No.: WO2011/001330
PCT Pub. Date: Jan. 6, 2011

(65) Prior Publication Data
US 2012/0106389 A1    May 3, 2012

(30) Foreign Application Priority Data
Jun. 29, 2009 (EP) .................................... 09164074

(51) Int. Cl.
*H04L 12/28* (2006.01)
*H04L 12/56* (2006.01)
*H04W 72/12* (2009.01)

(52) U.S. Cl.
CPC ................. *H04W 72/1221* (2013.01)
USPC .......................................... 370/252; 370/412

(58) Field of Classification Search
CPC ........ H04W 28/10; H04W 28/12; H04L 1/18; H04L 1/1829; H04L 1/1825; H04L 1/1835
USPC .................................................. 370/252, 412
See application file for complete search history.

(56) References Cited

U.S. PATENT DOCUMENTS

| | | | |
|---|---|---|---|
| 7,181,666 B2 * | 2/2007 | Grob et al. ..................... | 714/748 |
| 7,212,507 B2 * | 5/2007 | Wang et al. .................... | 370/329 |
| 7,724,640 B2 * | 5/2010 | Larsson ....................... | 370/216 |
| 7,953,003 B2 | 5/2011 | Moulsley et al. | |
| 2003/0123477 A1 * | 7/2003 | Gollamudi et al. ........... | 370/465 |
| 2004/0027991 A1 * | 2/2004 | Jang et al. ..................... | 370/230 |
| 2005/0220215 A1 * | 10/2005 | Tanabe et al. ................. | 375/295 |
| 2006/0045032 A1 * | 3/2006 | Hamada ........................ | 370/278 |
| 2007/0168826 A1 * | 7/2007 | Terry et al. .................... | 714/748 |
| 2007/0297325 A1 * | 12/2007 | Larsson ....................... | 370/216 |
| 2008/0095055 A1 | 4/2008 | Moulsley et al. | |
| 2009/0310493 A1 * | 12/2009 | Nogami ........................ | 370/252 |
| 2010/0238835 A1 * | 9/2010 | Lundgren et al. ............. | 370/253 |
| 2010/0302960 A1 * | 12/2010 | Bjorken et al. ............... | 370/252 |
| 2011/0002278 A1 * | 1/2011 | Lindoff et al. ................ | 370/329 |
| 2012/0250678 A1 * | 10/2012 | Sabella et al. ................ | 370/352 |

FOREIGN PATENT DOCUMENTS

GB           2453979 A        4/2009

* cited by examiner

*Primary Examiner* — Farah Faroul

(57) ABSTRACT

The present invention relates to a method for operating a network comprising a primary station communicating with a plurality of secondary stations, the method comprising the primary station communicating with a secondary station in a discontinuous mode; the secondary station transmitting to the primary station a control message based on the current status of the secondary station; the primary station changing a parameter of the discontinuous mode based on the control message.

17 Claims, 2 Drawing Sheets

RESOURCE ALLOCATION IN A COMMUNICATION NETWORK

FIELD OF THE INVENTION

The present invention relates to a method for communicating in a network. More specifically, the present invention relates to communication between a primary station and a secondary station, in a telecommunication network, like a cellular telecommunication network (e.g. UMTS, UMTS LTE, GSM).

BACKGROUND OF THE INVENTION

In wireless packet-data networks with centralised control, a mechanism is required to enable a base station (or eNB in UMTS LTE terminology) to prioritise effectively the allocation of uplink transmission resources between different mobile terminals (user terminals, or UEs, in UMTS LTE). As disclosed on FIG. 1, a primary station 100 being for example a base station in UMTS or a Node B (eNB) in LTE communicates by means of a plurality of channels 120 with a plurality of secondary stations 101 being for example a mobile station in UMTS or User Equipment (UE) in LTE. Each channel 120 may be dedicated to carry different kind of data like control data or user data. Each secondary station typically has data queued in buffers until it can transmit, when a resource is granted by the primary station; there may be buffers for a number of different streams, each with a different quality of service (QoS) requirement as shown on FIG. 2. As can be seen on the diagram of FIG. 2, three buffers or queues 21, 22 and 23 are shown. For each queue, a corresponding Quality of Service requirement is set, requiring a level of Quality of Service, for example to limit the delay of transmission or requiring regular transmissions at a minimal given interval. The eNB needs information to enable it to decide which UEs should be granted to transmit, and at what rate. To assist in this process, it is known for the UE to transmit requests for permission (so-called scheduling requests, or SRs), as well as the indication of the data in its buffers (namely buffer status reports, BSRs).

In the state-of-the-art, the threshold for triggering these events on the uplink is usually predetermined, or based on instantaneous channel and/or buffer occupancy conditions. Existing enhancements include methods which take into account the most recently granted data rate, or the average of the recently granted data rates. A UE can in fact store and analyse more details of its past transmission history, thereby extracting more accurate predictions of whether QoS targets are likely to be met.

SUMMARY OF THE INVENTION

It is an object of the invention to propose a method which alleviates the above problems.

It is another object of the invention to propose a method which provides more flexibility to the signalling of the secondary station.

In accordance with a first aspect of the invention, it is proposed a method of operating a communication system including a primary station communicating with at least one secondary station, the method comprising queuing at least one data unit in a secondary station buffer, estimating the time needed to deliver the at least one data unit with a predetermined probability of success, and, if the estimated time exceeds a given threshold, generating a resource signal.

In accordance with a second aspect of the invention, it is proposed a secondary station comprising means for communicating in a network including a primary station, the secondary station comprising at least one buffer for queuing at least one data unit, and control means for estimating the time needed to deliver the at least one data unit with a predetermined probability of success, and, transmission means for, if the estimated time exceeds a given threshold, generating a resource signal.

In accordance with a third aspect of the invention, it is proposed a primary station comprising means for communicating with at least one secondary station, the primary station comprising control means for estimating the time needed for the secondary station to deliver at least one data unit stored in a buffer of the secondary station with a predetermined probability of success, the control means being arranged for generating a resource signal, if the estimated time exceeds a given threshold.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
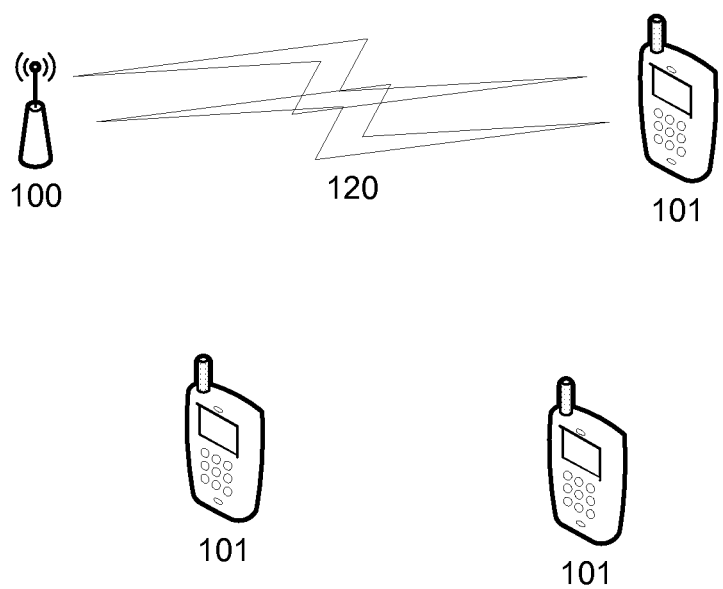
FIG. 1 is a diagram of a network in which the invention can be implemented.
Figure 2:
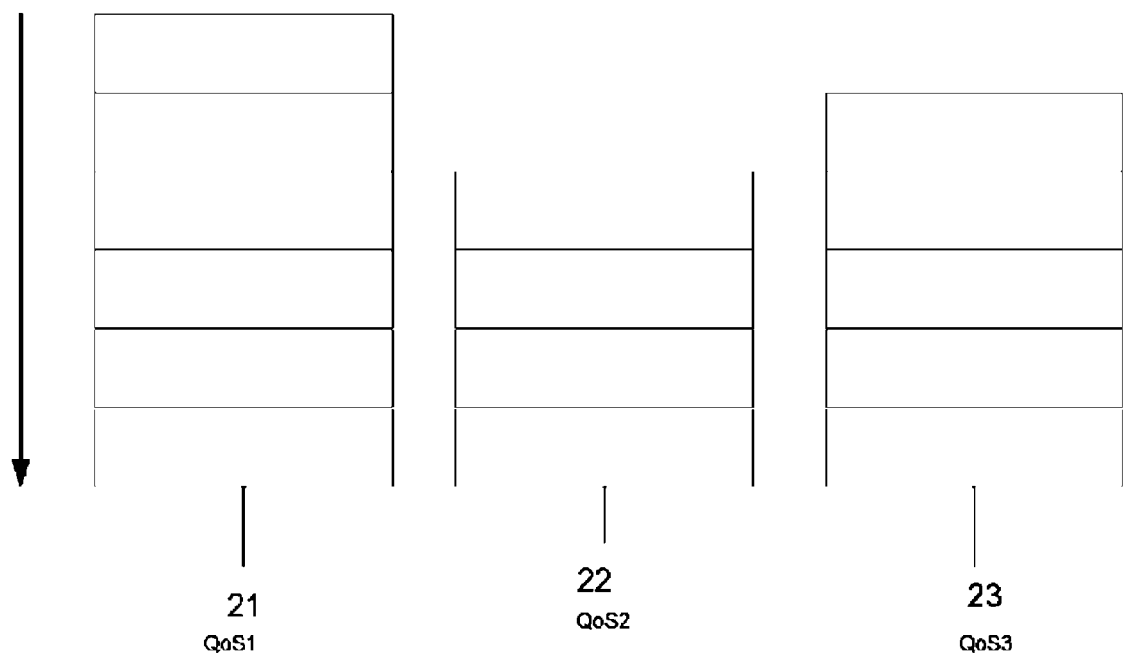
FIG. 2 represents queues for storing data packets in the secondary station before transmission.

This invention defines a set of rules for triggering signalling events on the uplink of a wireless communication system. The events in question are related to the information a central entity in such a network requires from mobile terminals in order to make accurate scheduling decisions and include:

The scheduling request itself;

Buffer status report;

Request for transmission at a particular rate or of a particular logical channel, priority, application.

The rules laid down in this invention enable the threshold used to trigger such events to be determined based on a combination of factors. These factors take into account the statistics of the past transmission history. The threshold is then either computed in the mobile terminal, or in the central scheduling entity and then signalled to the mobile terminal.

The proposed solution to the problems above is to enhance the range of possible triggers. More detailed statistical analysis of the triggering thresholds of above, and/or the introduction of additional thresholds, would yield a more efficient use of resources. The signalling of an SR or a BSR could potentially be triggered by a number of new events, for example the time needed to deliver a packet with a predetermined probability of success and/or the expected response time to the event triggered.

In particular, the invention considers the probability that a packet can be transmitted within a particular time (for example a latency threshold set by QoS requirements of the application from which the data packets originated), instead of the average or instantaneous time which is predicted to elapse before successful transmission.

An implementation of the invention can derive the probability of successful transmission within a particular time from consideration of the statistics of previous (H)ARQ transmissions and retransmissions.

The computations can be carried out over a sliding window of past scheduling instants, with the update rate of computation the same or less than the scheduling interval.

The invention allows an important contributor (namely (H)ARQ retransmission delay) to total transmission delay to be taken into account when deciding whether to trigger a SR or BSR event. This represents an improvement over the prior art (such as PHGB050012), which only considers delay already spent in the buffer and predicted delay waiting for first transmission, but not predicted delay for HARQ retransmissions or probability of successful transmission within a target time period.

In accordance with a first embodiment of the invention, it is proposed a method of operating a communication system, the method comprising of queuing data units in UE buffers, estimating the time needed to deliver packets with a predetermined probability of success (e.g. 98%), either in the UE itself or in the eNB, and, if the estimated time exceeds a given threshold, generating appropriate signalling (SR and/or BSR) to the eNB.

Thus, if there is a high transmission failure rate, it will likely require one or several retransmissions of the data packets, and the time needed to deliver a packet will be long.

Advantageously, the time needed to deliver packets is estimated based on a certain characteristic of the (H)ARQ processes in a UE. The possible candidates include:

a. The number of the HARQ retransmissions for the most recent transmission;

b. The average number of the HARQ retransmissions for the most recent transmissions (or a weighted average, e.g. calculated using a forgetting factor). In case of forgetting factor, it means that the contribution in the computation of the average of old transmissions is less than the contribution of more recent transmissions. This can be done for example by having factor being less than 1 weighting the transmission time of old transmissions. These factors may also be dependent over the time and further decrease with the time;

c. A certain parameter of the probability density function (pd f) of the number of HARQ retransmissions.

In accordance with this embodiment, the step of estimating the time is carried out in the primary station or the Node B and the signaling is a resource grant which indicates to the secondary station that a resource has been allocated to the secondary station. In a variant, the resource grant may specify which resource out of a set of resources has been allocated.

In a variant of this embodiment, the estimation of the time needed to transmit the data packet with a predetermined probability is based on a characteristic of a probability density function of the number of ARQ retransmissions.

wherein the time needed to deliver the at least one data unit is estimated based on the probability density function of transmission rate.

It is to be noted that the time needed to deliver the at least one data unit may be estimated with consideration of the time already spent in the secondary station buffer, or with an estimation of the time interval expected before transmission of the data unit starts, and/or with consideration of the expected response time to the resource signal.

Given that each data unit may have different priority or QoS requirement, the estimation of the interval expected before transmission of the data unit starts is made on the basis of the amount of further data units having a higher priority queued in the secondary station.

In response to the buffer report or the resource request, the primary station may send a resource grant for allocating of transmission resources or signal a change in the allocated transmission resources, for example, if semi persistent scheduling is used, to have a change in how frequent the semi persistently scheduled resources are.

In all of the variant discussed above, the primary station may signal the threshold. Moreover, the threshold may be different from a secondary station to another dependent on the respective priorities of the secondary stations or on the transmission conditions each secondary station is currently experiencing to avoid too frequent resource requests.

In a variant of the invention, the time needed to deliver packets is estimated based on the pdf of granted rate.

In another variant of the invention, it is proposed that the time needed to deliver packets is estimated with consideration of the total time already spent in the buffer, to determine the total delay.

In still another aspect of the invention, the time needed to deliver packets is estimated with consideration of the predicted length of time before transmission of the data starts, to determine the total delay. This estimation can be made based on e.g. the amount of other data of higher priority already buffered.

It is to be noted that sometimes that the time needed to deliver packets is estimated with consideration of the expected response time to the event being triggered.

In such a case, the response to the triggered event is the allocation of transmission resources or a change in the allocated transmission resources.

Other Embodiments

As an example, a trigger criterion according to the invention could be calculated as: (number of packets in queue, e.g. for a particular logical channel)×(predicted number of retransmissions)×(number of hops if relaying is used) divided by [(granted transmission rate)×((H)ARQ RTT)]

If the criterion is calculated at the centralised scheduler (e.g. the eNB), the criterion could for example be signalled for each logical channel, or for each priority class, or for each application, or for each UE, or broadcast in a cell.

The invention may be applicable to cellular packet communication systems, mobile telecommunication systems like UMTS LTE and UMTS LTE-Advanced, or other networks implementing discontinuous reception or transmission.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method of operating a communication system including a primary station communicating with at least one secondary station, the method comprising:

queuing at least one data unit in a secondary station buffer;

estimating a time needed to deliver the at least one data unit with a predetermined probability of success, wherein said estimated time needed to deliver the at least one data unit with a predetermined probability of success is determined based on a past transmission history of data units from the secondary station, wherein said past transmission history includes a forgetting factor; and, generating a resource signal, when the estimated time exceeds a given threshold.

2. The method of claim 1, wherein the step of estimating the time is performed in the secondary station and wherein the resource signal is one of: a request for transmission resources and a buffer status report representative of a content of the secondary station buffer.

3. The method of claim 1, wherein the step of estimating the time is performed in the primary station and the resource signal is a resource grant.

4. The method of claim 1, wherein the time needed to deliver the at least one data unit is estimated based on an ARQ (Automatic Repeat reQuest) process characteristic in the secondary station.

5. The method of claim 4, wherein the ARQ process characteristic comprises at least one of: a number of the ARQ retransmissions for a most recent transmission, an average number of ARQ (Automatic Repeat reQuest) retransmissions for a most recent transmissions, and a characteristic of a probability density function of the number of ARQ retransmissions.

6. The method as claimed in claim 1, wherein the time needed to deliver the at least one data unit is estimated based on a probability density function of transmission rate.

7. The method as claimed in claim 1, wherein the time needed to deliver the at least one data unit is estimated with consideration of a time said data unit has already spent in the secondary station buffer.

8. The method as claimed in claim 1, wherein the time needed to deliver the at least one data unit is estimated with consideration of an estimation of a time interval expected before transmission of the data unit starts.

9. The method of claim 8, wherein the estimation of the interval expected before transmission of the data unit starts based on an amount of further data units having a higher priority queued in the secondary station.

10. The method as claimed in claim 1, wherein the time needed to deliver the at least one data unit is estimated with consideration of an expected response time to the resource signal.

11. The method as claimed in claim 10, wherein the expected response to the resource signal is one of: an allocation of transmission resources and a change in the allocated transmission resources.

12. The method of claim 1, wherein the given threshold is based on of at least one of: a number of packets in queue, an estimated number of retransmissions to be expected, a number of hops if relaying is used, a granted transmission data rate, and an ARQ, (Automatic Repeat reQuest) Round Trip Time.

13. The method of claim 1, wherein the primary station signals the given threshold.

14. A secondary station communicating in a network including a primary station, the secondary station comprising:

at least one buffer for queuing at least one data unit, and means for estimating a time needed to deliver the at least one data unit with a predetermined probability of success, wherein said estimated time needed to deliver the at least one data unit with a predetermined probability of success is determined based on a past transmission history of data units from the secondary station, wherein said past transmission history includes a forgetting factor, and, means for generating a resource signal, when the estimated time exceeds a given threshold.

15. The secondary station of claim 14, wherein the given threshold is received from the primary station.

16. A primary station communicating with at least one secondary station, the primary station comprising:

means for estimating a time needed for the secondary station to deliver at least one data unit stored in a buffer of the secondary station with a predetermined probability of success, wherein said estimated time needed to deliver the at least one data unit with a predetermined probability of success is determined based on a past transmission history of data units from the secondary station, wherein said past transmission history includes a forgetting factor, and means for generating a resource signal, if the estimated time exceeds a given threshold.

17. The method of claim 1, wherein a weighting of elements of said past transmission history decreases over time.

* * * * *